Figure 1:
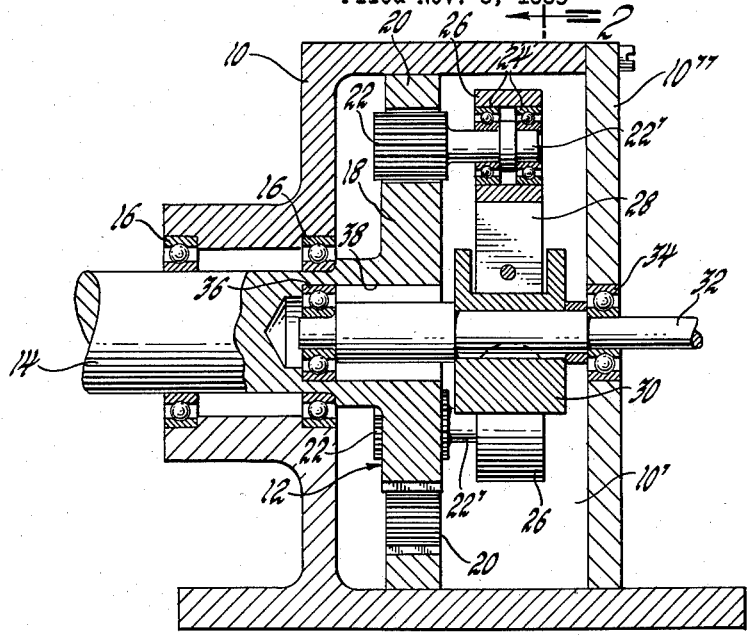

Feb. 14, 1961     E. F. KATZ     2,971,407

PRECISION GEAR TRAIN FOR SERVO CONTROL MECHANISM

Filed Nov. 9, 1959

INVENTOR.
Edwin F. Katz
BY
L. D. Burch
ATTORNEY

2,971,407
PRECISION GEAR TRAIN FOR SERVO CONTROL MECHANISM

Edwin F. Katz, Milwaukee, Wis., assignor to General Motors Corporation, Detroit, Mich., a corporation of Delaware Filed Nov. 9, 1959, Ser. No. 851,691

6 Claims. (Cl. 74—801)

This invention relates generally to servo control mechanisms, and more particularly to a precision gear set for the accurate transmission of control signal data between the several stations of a servo control mechanism of the type used in computers, instrument and guidance control systems and the like.

Servo control mechanisms of the type mentioned require extreme precision in critical data transmitting gear trains since any instantaneous inaccuracies resulting from gear meshing error or backlash directly affects the circular error probability of the system. In the fine pitch gearing necessarily employed in such servo and instrument control systems, gear train error may result from deviations from the theoretically ideal in various dimensions of the gears themselves or in their assembly, either in their original manufacture or as a result of wear. Among such factors may be reduced gear tooth thickness, increased gear center distances, bearing play, eccentricities in gears, ball bearings or shafts, variations in clearances between operating parts such as between the shaft and bearing, and the lack of rigidity in parts and structure, particularly in applications requiring extreme miniaturization of system components. Such factors have made attainment of the desired, necessary and ever increasing gear accuracy required for data transmittal in such servo control mechanisms extremely difficult to achieve, particularly in quantity manufacture. Environmental and operational factors and sometimes necessary extreme variations in these factors often dictate the use of further error inducing design clearances. The angular displacement introduced by the application of torque load to the output shaft is a further separate and significant gear error contributing factor adversely affecting accurate data transmission, particularly in high gain servo control loops.

Of the foregoing error contributing factors, reduction in circular gear tooth thickness and variations from standard center distances are factors which are necessarily manufactured into a gear train in order to keep the gear train free running. These two factors avoid the binding which might otherwise result from eccentricity of the gears or bearing journals. Bearing play, eccentricity in parts, and physical clearances necessarily result from dimensional tolerances and manufacturing vagaries. As indicated above, rigidity is of course governed by the design and physical properties of the structure and its parts whereas the environmental factors are generally dependent upon the application of the gear unit rather than on design details. Angular torque load induced displacement between the input and output members results from the elasticity of the entire gear unit, i.e. the deflection of the gear teeth, torsional deflections of the shafts, etc. Such torque load deflection is thus directly proportional to the load applied.

The invention contemplates a precision data transmitting gear train for servo controlled mechanisms of the type described having means for statistically reducing and averaging the positional error of several simultaneous meshes thereby minimizing the transmission of instantaneous inaccuracies which would otherwise directly affect system error. This is accomplished in a preferred illustrative embodiment by providing a planetary gear set with equiangularly spaced planetary gears independently journaled and mounted to a signal transmitting shaft member by a plurality of radially extending and relatively stiff cantilever spring members.

Figure 2:
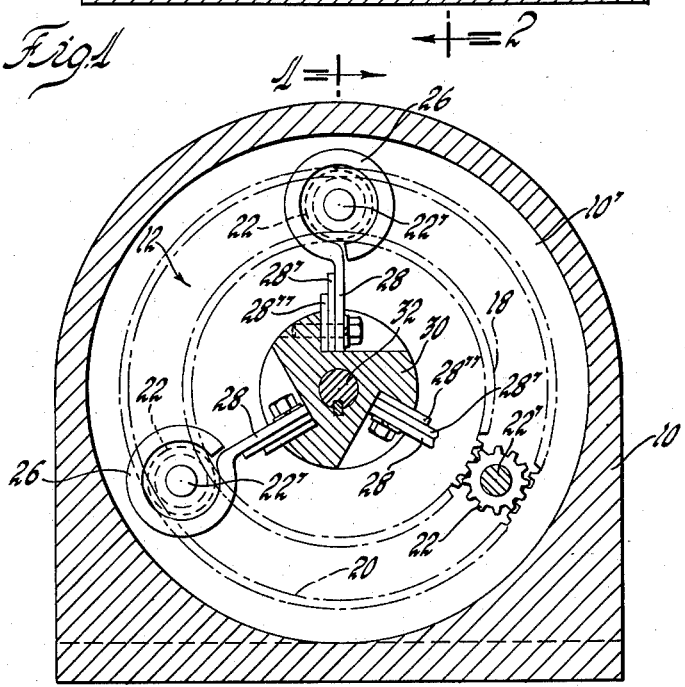

The foregoing and other objects and advantages of the invention will be apparent from the following description having reference to the accompanying drawing, in which:

Figure 1 is a longitudinal sectional view taken substantially in the plane of line 1—1 of Figure 2 and shows a data transmitting planetary gear set constructed in accordance with the invention; and Figure 2 is a transverse sectional view taken substantially in the plane of the line 2—2 of Figure 1.

Referring more particularly to the drawing, a case 10 defines a chamber 10' housing a precision data transmitting planetary gear set constructed in accordance with the invention. This planetary gear set or train is indicated generally at 12 and includes a signal transmitting input shaft 14. One end of the shaft 14 projects within and is suitably journaled in the casing by spaced antifriction bearings 16. A sun pinion gear 18 is carried by the end of the shaft 14 within the gear housing chamber 10'. A ring gear 20 is suitably mounted with respect to the casing in concentric spaced relation to the sun gear 18. Three pinion gears 22 are interposed between and drivingly engage the teeth of the sun and ring gears, being rotatively driven by the sun gear against the reaction provided by the ring gear.

In the illustrative embodiment, the planetary gears 22 are equiangularly spaced about the common axis of the input shaft and the sun and ring gears and are each journaled for rotation about their respective axes. Such journaling is provided by a shaft portion 22' extending axially from the gear portion of each planetary gear. These shaft portions are journaled in antifriction bearings 24. The bearings 24 are mounted in axially spaced pairs within cylindrical housings 26 formed integrally with or carried by the outer ends of radially extending leaf spring members 28. The leaf spring members 28 extend radially inwardly from the bearing housings 26 and are suitably secured at their inner ends to a hub member 30 which is in turn drivingly secured to a signal transmitting output shaft 32, one end of which extends within the chamber 10'. The end of the output shaft 32 extending within the gear chamber 10' is journaled in co-axial relation to the input shaft 14 by spaced antifriction bearings 34 and 36, the bearing 34 being carried by a casing cover member 10" and the bearing 36 being interposed between the end of the output shaft 32 and a bore 38 extending axially of the input shaft 10.

In practice, the inherent stiffness of the relatively short, unsupported dimension of the several cantilevered leaf springs 28 permits independent adjustment of the several planetary pinions to compensate for the backlash errors occurring at the several simultaneous meshes as a result of the various gear error contributing factors mentioned above. The components of such independent error compensation are resolved by their application through the planetary gear carrying spring assembly. By such resolution, the planetary gear carrying spring assembly serves to average the positional errors of the several simultaneous and angularly disposed meshes and thus transmits only a negligible average or resultant error to the output shaft 34. Such resolution of the gear error compensation of the several simultaneous meshes thus statistically reduces both gear train and probable servo system error.

While only three equiangularly spaced planetary gears are used in the illustrative embodiment, it will be obvious that any plurality of such gears might be used with various angular spacings or orientations between such gears. It will be noted that the torque transmitting characteristic of the above described embodiment of the invention is dependent upon the torsional stiffness of the planetary carrier comprising the cantilevered leaf springs 28 and their mounting hub 30. The inherent stiffness of the relatively short, unsupported dimension of the leaf springs may, of course, be further augmented by stepped helper springs as indicated at 28' and 28".

From the foregoing description of a preferred illustrative embodiment, it will be apparent to those skilled in the art that numerous modifications might be made therein without departing from the spirit and scope of the invention as defined in the following claims.

I claim:

1. In a servo control mechanism, a data transmitting planetary gear mechanism comprising a housing defining a gear mounting chamber, an input shaft mounted for rotation with respect to said housing and projecting within said housing chamber, a pinion gear on said input shaft within said housing chamber, a ring gear carried by said housing in concentric spaced relation to said pinion gear, an output shaft mounted for rotation with respect to said housing, said output shaft projecting within said housing chamber in coaxial alignment with said input shaft, a plurality of planetary gears equiangularly spaced and drivingly in mesh with said pinion and ring gears, and carrier means for drivingly connecting said planetary gears to said output shaft, said carrier means including bearing means for mounting each of said planetary gears for rotation about its respective axis and a plurality of relatively stiff spring means for independently and drivingly interconnecting and mounting each of said bearing means with respect to said output shaft.

2. A data transmitting planetary gear mechanism for a servo control device, said planetary gear mechanism comprising an input shaft and an output shaft mounted for rotation with respect to each other about a common axis, a pinion gear carried by one of said shafts, a ring gear in concentric spaced relation to said pinion gear, a plurality of planetary gears drivingly in mesh with and reacting between said pinion and ring gears, independent bearing means for rotatably mounting each of said planetary gears for rotation about its respective axis, and a plurality of spring means drivingly interconnecting and independently mounting each of said bearing means to the other of said shafts in radially spaced relation thereto.

3. A data transmitting planetary gear mechanism as set forth in claim 2 wherein said spring means mount and maintain each of said planetary gears in substantially equiangularly spaced relation to each other about the axis of said shafts.

4. A data transmitting planetary gear mechanism as set forth in claim 2 wherein each of said spring means includes a relatively stiff leaf spring independently mounting its respective planetary gear and bearing means in cantilever relation to said other shaft.

5. A precision gear train for data transmission in a servo control mechanism, said gear train including, an input member and an output member, means for mounting said members for coaxial rotation with respect to each other, a sun gear carried by one of said members, a plurality of planetary gears angularly spaced with respect to each other and in driving engagement with said sun gear, means for providing a driving reaction to the rotation of said planetary gears including a ring gear spacedly embracing said sun gear and in mesh with said planetary gears, means for rotatably mounting each of said planetary gears for rotation about its respective axis and in mesh with said sun and ring gears, and spring means independently and drivingly interconnecting each of said planetary gear mounting means to the other of said members thereby providing an error compensating backlash adjustment whereby negligible gear error is transmitted in the signal transferred between said input and output members.

6. A precision gear train for a data transmitting servo control mechanism, said gear train comprising, in combination, an input shaft member and an output shaft member, means for mounting said shaft members for coaxial rotation with respect to each other, a sun gear carried by one of said shaft members, a plurality of planetary gears angularly spaced with respect to each other and in driving engagement with said sun gear, means for providing a driving reaction to the rotation of said planetary gears including a ring gear spacedly embracing said sun gear and in mesh with said planetary gears, means for rotatably mounting each of said planetary gears for rotation in mesh with said sun and ring gears, and a plurality of cantilever spring means for independently and drivingly interconnecting each of said planetary gears and its mounting means to the other of said shaft members thereby providing independent gear error compensating adjustments between the several gears, said spring means resolving the several error compensating adjustments to transmit only a negligible gear error signal between said input and output shaft members.

References Cited in the file of this patent

UNITED STATES PATENTS 2,893,268     Liebel  _____ July 7, 1959

FOREIGN PATENTS 682,275     Germany _____ Sept. 21, 1939